United States Patent [19]

Ayotte

[11] 4,380,563
[45] Apr. 19, 1983

[54] ADHESIVE DEVICE OF FELT SUBSTRATE, RELEASE SHEET AND ADHESIVE AND METHOD

[75] Inventor: Gordon R. Ayotte, Marshall, Mich.

[73] Assignee: Trim Parts Inc., Marshall, Mich.

[21] Appl. No.: 353,430

[22] Filed: Mar. 1, 1982

[51] Int. Cl.³ .................... B32B 7/14; D04H 1/08
[52] U.S. Cl. .................................. 428/40; 156/252; 156/264; 156/291; 427/282; 428/42; 428/45; 428/47; 428/48; 428/195; 428/201; 428/202; 428/280; 428/282; 428/343; 428/352; 428/354
[58] Field of Search .............. 428/40, 42, 43, 195, 428/201, 202, 280, 282, 343, 352, 354, 45, 47, 48; 427/282; 156/252, 264, 291

[56] References Cited

U.S. PATENT DOCUMENTS 3,955,030 5/1976 Winters .......................... 428/280

*Primary Examiner*—Marion McCamish
*Attorney, Agent, or Firm*—Harness, Dickey & Pierce

[57] ABSTRACT

This disclosure relates to a new adhesive device and method of forming the same which includes providing a laminate comprised of a felt substrate, release paper, and adhesive. The release paper is permanently attached to one side of the felt substrate to form a sheet having a felt side exposed and a release side of the release paper exposed. This sheet may be divided into sections (to form a plurality of separable pads or sections) by a cut extending through all but connecting tabs between adjacent sections on the sheet. Adhesive is applied to all but a peripheral edge portion of the other side of the felt substrate on each of the sections. A plurality of sheets or laminates may be stacked with the adhesive on one laminate adjacent the exposed release side of the release paper on another laminate. In addition, a separate sheet of release paper may be placed adjacent the exposed adhesive on the outermost stacked laminate.

20 Claims, 3 Drawing Figures

ADHESIVE DEVICE OF FELT SUBSTRATE, RELEASE SHEET AND ADHESIVE AND METHOD

BACKGROUND AND SUMMARY OF THE INVENTION

The present invention pertains primarily to laminates and methods of forming the same, and more particularly to laminates for use in providing sound deadening, insulation, or the like.

It has generally been the practice in providing sound deadening pads for use on automobile roofs or the like to provide a shipping pallet containing several layers or sheets of sound deadening pads. Each layer typically comprises a number of square or rectangular die-cut sound deadening pads laid out side-by-side in a grid-like format, and connected together edge by edge by connecting tabs made up of portions of the sound deadening pads which have not been die-cut. Each separable sound deadening pad typically comprises a felt pad having asphaltic material therein and coated on its entire upper surface with a pressure sensitive adhesive. In use, pads of this type would be applied to the inner surface of an automobile roof using the pressure sensitive adhesive on the pads.

In the past, sheets of the adhesive coated sound deadening pads have been horizontally separated from one another by alternating layers of release paper. Thus when the sound deadening pads making up one layer or sheet have been used up, a layer of release paper would have to be removed to expose the next sheet of sound deadening pads. This process of course continues until the last sheet of sound deadening pads on the pallet is used up. Needless to say, the necessity of removing the alternating layers of release paper involves additional labor and creates a significant amount of waste paper. On an automotive assembly line, where efficiency is often measured in units produced per hour, even brief periods of additional labor on one item can slow down an entire assembly line, thus resulting in decreased efficiency for an entire automotive assembly plant. Furthermore, the waste created by the removed layers of release paper, in addition to taking up valuable space alongside the assembly line, also requires the labor of plant personnel for periodic removal from the assembly line and subsequent disposal.

An additional problem presented by currently used sound deadening pads of the type referred to above is that the adhesive-coated felt pads making up on sheet on a pallet often butt up against similarly coated felt pads along their various edges. With adhesive being applied to the entire top surface of such felt pads, adjacent pads often stick together edge to edge, thus creating delays and other associated problems on the assembly line caused by having to separate adjacent pads from one another.

Accordingly, it is a principle object of the present invention to provide an adhesive device and method of producing the same which eliminates the waste and labor involved with separate layers of release paper and also eliminates the problems associated with adjacent adhesive-coated felt pads sticking to one another.

In general, the adhesive device and method according to the present invention includes providing a laminate comprised of a felt substrate, release paper, and adhesive. The release paper is permanently attached to one side of the felt substrate to form a sheet having a felt side exposed and a release side of the release paper exposed. This sheet may be divided into sections (to form a plurality of separable pads or sections) by a cut extending through all but connecting tabs between adjacent sections on the sheet. Adhesive is applied to all but a peripheral edge portion of the other side of the felt substrate on each of the sections. This uncoated peripheral edge portion may comprise a generally uniform border portion on each section with additional uncoated area being provided at corners or the like of the pad, where hand contact is made to separate pads from one another. A plurality of sheets or laminates may be arranged in overlapping relationship or stacked with the adhesive on one laminate adjacent the exposed release side of the release paper on another laminate. In addition, a separate sheet of release paper may be placed adjacent the exposed adhesive on the outermost laminate.

Additional advantages and features of the present invention will become apparent from a reading of the detailed description of the preferred embodiment which makes reference to the following set of drawings in which:

DETAILED DESCRIPTION OF THE PREFERRED EMBODIMENT

Figure 1:
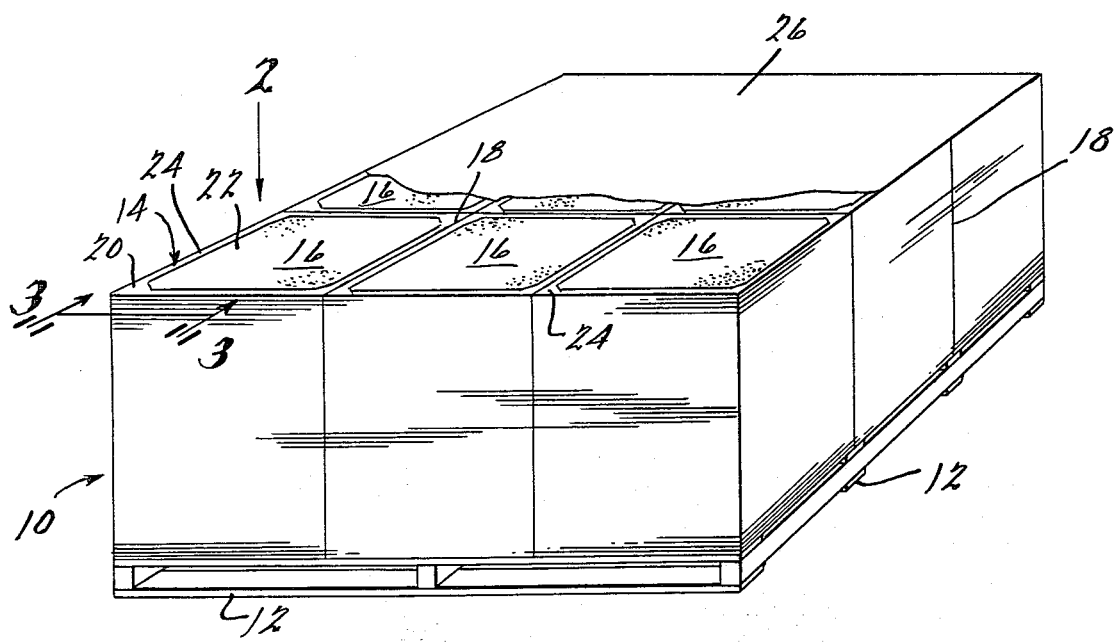
FIG. 1 is a perspective view, partially broken away, showing a plurality of laminates made in accordance with the present invention stacked on a shipping pallet.

Referring now to the drawings wherein the showings are for the purpose of illustrating a preferred embodiment of the present invention and are not for the purpose of limiting the invention, FIG. 1 shows a plurality of laminates 10 made in accordance with the present invention stacked one on top of another on a conventional shipping pallet 12. As depicted herein, each laminate or sheet 14 is made up of nine sections or pads 16 (which for example may be one foot square, although other shapes and sizes are equally possible depending upon the particular application), divided from one another by a cut or slit 18 extending through all but connecting tabs (not shown in this Figure) between adjacent sections or pads on the sheet 14. Each section comprises a generally square felt pad 20. Adhesive 22 is applied to all but a peripheral edge portion 24 on each of the felt pads 20. A separate sheet of release paper 26 is placed on top of the uppermost sheet 14 to cover the exposed adhesive 22.

Figure 2:
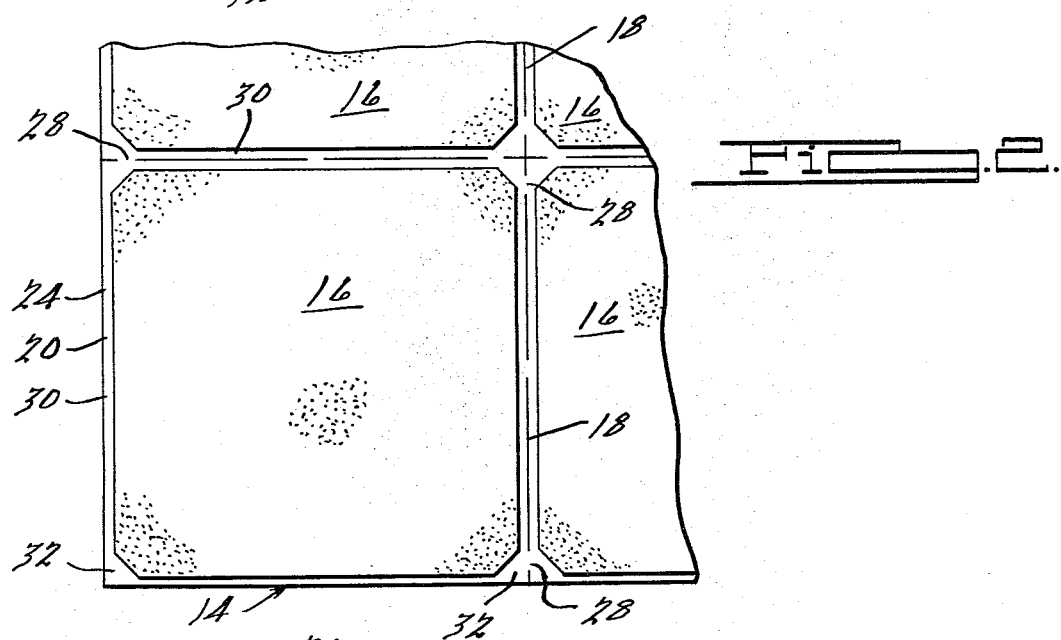
FIG. 2 is a top view, partially broken away, generally along the arrow 2 in FIG. 1.

Referring now to FIG. 2, a top view of sheet 14 is shown. The four adjacent sections or pads 16 shown are, as noted above, separated by a cut 18 extending through all but connecting tabs 28 between the sections. Tabs 28 are simply uncut portions of the underlying felt substrate 20, and are relatively narrow in width so that they can be broken away easily when it is desired to separate adjacent sections or pads 16. This gives the sheets 14 a perforated or slit appearance between adjacent sections. The number and width of the connecting tabs will of course be determined by the inherent strength of the particular felt substrate used. The peripheral edge portion 24 is made up of both a generally uniform border portion 30 and corner portions 32 where the size of the border is increased to simplify lifting and handling of sections 16 by using the corners of the felt pads 20. For example, a one-quarter inch border portion with enlarged corner portions as shown, has been found useful on one foot square sections or pads.

Figure 3:
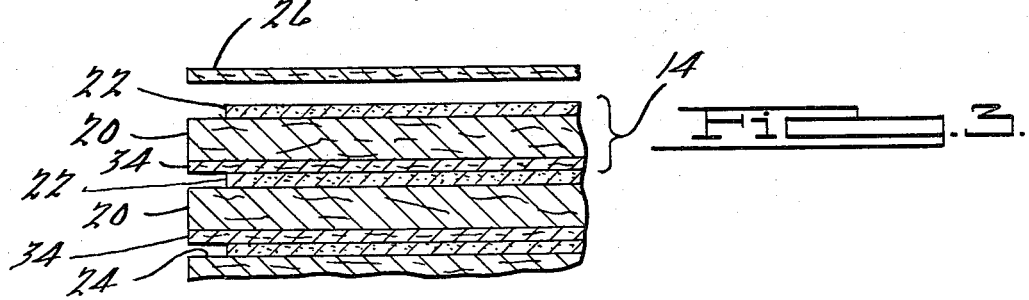
FIG. 3 is a partial sectional edge view, generally along the line 3—3 of FIG. 1, showing a plurality of laminates stacked on one another.

As best shown in FIG. 3, each section 16 of each laminate or sheet 14 is comprised of a felt substrate 20, release paper 34, and adhesive 22. The stack of laminates shown in this figure of course contains several such repeating layers. The separate sheet of release paper 26, also depicted in FIG. 1, is shown separated from the layers below for purposes of illustration only.

In accordance with the method of the present invention, the release paper or slip sheet 34 is attached to one side of the felt substrate 20 to form a sheet having a felt side exposed and a release side of the release paper exposed. Since conventional release paper may have either one or two release sides, it is important to insure that a release side of the release paper is exposed. The other side of the release paper is permanently attached to the felt pad 20 using such conventional methods are adhesive bonding, heat laminating, or the like. Typically, both the felt substrate and release paper are received in roll form, so conventional roll handling procedures such as laminating or the like are usable with the present invention.

After the release paper 34 is attached to the felt substrate 20, the resulting sheet or laminate 14 is die-cut into a plurality of sections or pads 16 using conventional die-cutting techniques. Of course, as noted hereinabove, connecting tabs 28 are left between adjacent sections 16 on sheet 14 to aid in subsequent handling and stacking of the sheets. In this particular configuration, at least one connecting tab is present between adjacent sections. It is believed to be significant that the die-cutting be performed at this stage of the process, since die-cutting becomes considerably more difficult if not impossible after adhesive has been applied to the formed sheets.

Following die-cutting, a pressure sensitive adhesive 22 or the like is applied to the exposed felt side of all but the peripheral edge portion 24 of each of the sections 16. The adhesive maybe applied in a desired pattern using such conventional techniques as silk-screening or the like. As noted above, adhesive is applied to all but the peripheral edge portions of each section, thus avoiding contact with the die-cut edges of the sections. Furthermore, the enlarged corner areas, where no adhesive has been applied, facilitate removal of the sections or pads from the stack and also make handling easier.

It is believed that most of the known pressure sensitive adhesives are suitable for use with the present invention provided that they are compatible with the substrate. Very often, the felt substrate 20 referred to herein is saturated with an asphaltic material to increase density and sound deadening performance. Needless to say, the presence of such asphaltic or other petroleum-based materials may affect choice of adhesives. However, the choice of a particular adhesive for a particular substrate is believed to be within the knowledge of one skilled in the art. Likewise, the choice of a particular release paper and method of attachment to a particular substrate are also believed to be within the knowledge of one skilled in the art. As used herein, the terms "felt pad" or "felt substrate" are meant to include known conventional felt materials and battings, as well as other substitute or synthetic materials such as cardboard, fiberboard, elastomeric sheet, cellular foam, and the like.

After the adhesive 22 has been applied, the laminate or sheet 14 may be dried if necessary to set the adhesive. Conventional ovens, heating apparatus, or other known drying techniques are believed to be usable with the present invention. After such drying, the individual sheets or laminates 14 are stacked on top of one another so that the adhesive on one laminate is stacked adjacent the exposed release side of the attached release paper layer 34 on the next laminate. When a pallet load of sheets has been stacked, a separate sheet of release paper is placed on top of the exposed top adhesive surface to protect the same during shipping.

Needless to say, the laminate produced in accordance with the present invention is believed to be usable in a wide variety of applications. It may be produced and/or provided in either single sections stacked one on top of another, or in side by side sheets as described in the preferred embodiment hereinabove. Among the contemplated uses for the present laminate are sound deadening for automobiles, boats, appliances, industrial equipment, or the like, as well as other uses such as insulation or padding in automobiles, boats, appliances, industrial equipment, or the like. The automotive uses referred to above include interior roof sound deadening, under-the-hood or trunk insulation, trunk padding, interior trim padding and/or sound deadening, floor padding, vinyl roof padding, or the like.

Among the advantages of the present invention, in addition to those enumerated above, is that a laminate is provided which eliminates the need for separating release paper from adhesive-coated felt pads. This of course reduces labor, and in addition, eliminates the waste caused by the disposable release paper layers. Since the laminates of the present invention are not coated on their edges, the problems associated with adjacent adhesive-coated felt pads sticking to one another are eliminated. In addition, a stacked pallet comprised of several sheets or laminates made in accordance with the present invention also presents an alternative method of removal of the separate sections or pads from the pallet, since the sections are removable either horizontally (layer-by-layer) or vertically (column-by-column) by merely breaking the connecting tabs between adjacent sections.

While the above description constitutes the preferred embodiment of the present invention, it will be appreciated that the invention is susceptible to modification, variation, and change without departing from the proper scope or fair meaning of the accompanying claims.

What is claimed is:

1. A laminate for use in providing sound deadening, insulation, or the like comprising a felt substrate having release paper attached to one side of said felt substrate with a release side of said release paper exposed on said one side, and adhesive applied to all but a peripheral edge portion of the other side of said felt substrate.

2. The invention of claim 1 wherein a plurality of laminates are arranged in overlapping relationship so that the adhesive on one laminate is adjacent the exposed release side of said release paper on another laminate.

3. The invention of claim 2 wherein a plurality of said overlapping laminates are arranged in side-by-side relationship.

4. The invention of claim 3 wherein a separate sheet of release paper is placed adjacent the exposed adhesive on at least one laminate.

5. A laminate for use in providing sound deadening, insulation, or the like comprising:
  (a) a felt substrate,
  (b) release paper attached to one side of said felt substrate to form a sheet having a felt side exposed and a release side of said release paper exposed, said sheet being divided into sections by a cut extending through all but at least one connecting tab between adjacent sections on said sheet, and
  (c) adhesive applied to all but a peripheral edge portion of the other side of said felt substrate on each of said sections.

6. The invention of claim 5 wherein each of said sections is generally rectangular and wherein said peripheral edge portion includes a generally uniform border portion on each of said sections, except at the corners thereof, where the size of the border is increased.

7. An adhesive device for use in providing sound deadening, insulation, or the like comprising a plurality of laminates, each of which comprises:
  (a) a felt substrate,
  (b) release paper attached to one side of said felt substrate to form a sheet having a felt side exposed and a release side of said release paper exposed, said sheet being divided into sections by a cut extending through all but at least one connecting tab between adjacent sections on said sheet, and
  (c) adhesive applied to all but a peripheral edge portion of the other side of said felt substrate on each of said sections, wherein said laminates are stacked so that the adhesive on one laminate is adjacent the exposed release side of said release paper on another laminate.

8. The invention of claim 7 wherein each of said sections is generally rectangular and wherein said peripheral edge portion includes a generally uniform border portion on each of said sections, except at the corners thereof, where the size of the border is increased.

9. The invention of claim 7 wherein said adhesive device further includes a separate sheet of release paper adjacent the exposed adhesive on one laminate.

10. The invention of claim 7 wherein said felt substrate comprises at least one material selected from the group consisting of felt batting, compressed fiber batting, cardboard, fiberboard, elastomeric sheet, and cellular foam.

11. A method of forming a laminate comprised of a felt substrate, release paper, and adhesive comprising the steps of:
  (a) attaching release paper to one side of a felt substrate to from a sheet having a felt side exposed and a release side of said release paper exposed,
  (b) forming said sheet into sections by cutting all but at least one connecting tab between adjacent sections on said sheet, and
  (c) applying adhesive to the exposed felt side of all but a peripheral edge portion on each of said sections.

12. The invention of claim 11 wherein said method further comprises drying said laminate.

13. The invention of claim 11 wherein said method further comprises arranging a plurality of said laminates in overlapping relationship so that the adhesive on one laminate is placed adjacent the exposed release side of said release paper on another laminate.

14. The invention of claim 11 wherein said step of attaching release paper to a felt substrate comprises adhesive bonding.

15. The invention of claim 11 wherein said forming step comprises die-cutting.

16. The invention of claim 11 wherein said step of applying adhesive comprises silk-screening said adhesive.

17. A method of forming a laminate comprised of a felt substrate, release paper, and adhesive comprising the steps of:
  (a) adhesive bonding release paper to one side of a felt substrate to form a sheet having a felt side exposed and a release side of said release paper exposed,
  (b) die-cutting said sheet into sections by cutting all but at least one connecting tab between adjacent sections on said sheet, and
  (c) silk-screening adhesive to the exposed felt side of all but a peripheral edge portion on each of said sections.

18. The invention of claim 17 wherein said method further comprises drying said laminate.

19. The invention of claim 17 wherein said method further comprises stacking a plurality of said laminates on top of one another so that the adhesive on one laminate is stacked adjacent the exposed release side of said release paper on another laminate.

20. A laminate produced in accordance with the method of claim 17.

* * * * *

UNITED STATES PATENT AND TRADEMARK OFFICE
CERTIFICATE OF CORRECTION

PATENT NO. : 4,380,563
DATED : April 19, 1983
INVENTOR(S) : Gordon R. Ayotte

It is certified that error appears in the above-identified patent and that said Letters Patent are hereby corrected as shown below:

Column 1, line 17, "by" (first occurrence) should be -- to --.

Column 1, line 49, "on" should be -- one --.

Column 3, line 23, "are" should be -- as --.

Signed and Sealed this

Ninth Day of August 1983

[SEAL]

Attest:

GERALD J. MOSSINGHOFF

Attesting Officer *Commissioner of Patents and Trademarks*